(12) United States Patent  
Komatsu

(10) Patent No.: US 8,386,993 B2  
(45) Date of Patent: Feb. 26, 2013

(54) WORKFLOW SYSTEM AND COMPUTER READABLE MEDIUM

(75) Inventor: Yutaka Komatsu, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1377 days.

(21) Appl. No.: 12/053,272

(22) Filed: Mar. 21, 2008

(65) Prior Publication Data

US 2009/0089737 A1    Apr. 2, 2009

(30) Foreign Application Priority Data

Sep. 28, 2007   (JP) ................. 2007-255249

(51) Int. Cl.
*G06F 9/44* (2006.01)
*G06Q 10/00* (2012.01)

(52) U.S. Cl. ........ 717/102; 717/101; 717/104; 705/7.26

(58) Field of Classification Search ............... None
See application file for complete search history.

(56) References Cited

U.S. PATENT DOCUMENTS

| | | | | |
|---|---|---|---|---|
| 6,026,365 A | * | 2/2000 | Hayashi | 705/7.26 |
| 6,088,679 A | * | 7/2000 | Barkley | 705/7.26 |
| 6,115,640 A | * | 9/2000 | Tarumi | 700/99 |
| 6,151,583 A | * | 11/2000 | Ohmura et al. | 705/7.26 |
| 6,546,364 B1 | * | 4/2003 | Smirnov et al. | 703/22 |
| 6,632,251 B1 | * | 10/2003 | Rutten et al. | 715/205 |
| 7,272,816 B2 | * | 9/2007 | Schulz et al. | 717/104 |
| 7,529,762 B2 | * | 5/2009 | Casati et al. | 705/301 |
| 7,885,847 B2 | * | 2/2011 | Wodtke et al. | 705/7.26 |
| 8,055,514 B2 | * | 11/2011 | Elsholz | 705/3 |
| 2002/0007300 A1 | * | 1/2002 | Slatter | 705/9 |
| 2002/0052769 A1 | * | 5/2002 | Navani et al. | 705/7 |
| 2002/0078432 A1 | * | 6/2002 | Charisius et al. | 717/102 |
| 2002/0138322 A1 | * | 9/2002 | Umezawa et al. | 705/8 |
| 2003/0004770 A1 | * | 1/2003 | Miller et al. | 705/8 |

(Continued)

FOREIGN PATENT DOCUMENTS

| JP | 8-36538 A | | 2/1996 |
|---|---|---|---|
| JP | 10214113 A | * | 8/1998 |

(Continued)

OTHER PUBLICATIONS

Hristo Koshutanski et al., "An Access Control Framework for Business Processes for Web Services", [Online], ACM Oct. 2003, pp. 1-10, [Retrieved from Internet on Oct. 11, 2012], <http://www.koshutanski.net/Publications/kosh-mass-03-XMLSec.pdf>.*

(Continued)

*Primary Examiner* — Thuy Dao
*Assistant Examiner* — Ziaul A Chowdhury
(74) *Attorney, Agent, or Firm* — Sughrue Mion, PLLC

(57) ABSTRACT

A workflow system includes: a workflow storage that stores workflows built by connecting a plurality of tasks assigned to persons in charge, respectively; a task extracting unit that extracts at least one task from each of two or more of the workflows stored in the workflow storage; a site creation unit that creates a conference site of which an access authority is given to the persons in charge of the tasks extracted by the task extracting unit and in which electronic information is shared; and an access controller that controls access to the conference site created by the site creation unit in accordance with the authority.

8 Claims, 8 Drawing Sheets

U.S. PATENT DOCUMENTS

| | | |
|---|---|---|
| 2003/0177046 A1* | 9/2003 | Socha-Leialoha ................ 705/7 |
| 2004/0044636 A1* | 3/2004 | Casati et al. ...................... 707/1 |
| 2004/0083448 A1* | 4/2004 | Schulz et al. ................. 717/101 |
| 2004/0111430 A1* | 6/2004 | Hertling et al. ............ 707/104.1 |
| 2004/0187089 A1* | 9/2004 | Schulz .......................... 717/101 |
| 2005/0209904 A1 | 9/2005 | Hayashi |
| 2007/0208603 A1* | 9/2007 | Ohsaki .............................. 705/8 |
| 2007/0240099 A1* | 10/2007 | Jahn et al. ..................... 717/104 |
| 2007/0245298 A1* | 10/2007 | Grabarnik et al. ............ 717/104 |
| 2007/0255631 A1* | 11/2007 | Schmidt et al. ................ 705/27 |
| 2008/0221952 A1* | 9/2008 | Mohri .............................. 705/7 |
| 2008/0294493 A1* | 11/2008 | Ohsaki .............................. 705/9 |
| 2008/0313024 A1* | 12/2008 | Kunichika et al. ............. 705/11 |
| 2009/0037569 A1* | 2/2009 | O'Loughlin et al. ......... 709/224 |

FOREIGN PATENT DOCUMENTS

| | | |
|---|---|---|
| JP | 2005-038171 A | 2/2005 |
| JP | 2005-267116 A | 9/2005 |
| JP | 2006-92073 A | 4/2006 |
| JP | 2007-108827 A | 4/2007 |
| JP | 2008-090667 A | 4/2008 |

OTHER PUBLICATIONS

Basit Shafiq et al., "Access Control Mangement in A Distributed Environment Supporting Dynamic Collaboration", [Online], ACM 2005, pp. 104-112, [Retrieved from Internet on Oct. 11, 2012], <https://www.cerias.purdue.edu/assets/pdf/bibtex_archive/2005-100.pdf>.*

Weigang Wang, "Team-and-Role-Based Organizational Context and Access Control for Cooperative Hypermedia Environments", [Online], ACM 1999, pp. 1-10, [Retrieved from Internet on Oct. 11, 2012], <http://citeseerx.ist.psu.edu/viewdoc/download?doi=10.1.1.119.3048&rep=rep1&type=pdf>.*

Israel Z. Ben-Shaul et al., "Integrating Groupware Activities into Workflow Management Systems", [Online], IEEE 1996, pp. 1-10, [Retrieved from Internet on Oct. 12, 2012], <http://academiccommons.columbia.edu/download/fedora_content/download/ac:144104/CONTENT/cucs-002-95.pdf>.*

Japanese Notification of Reasons for Refusal dated Nov. 10, 2009, in corresponding Japanese Application No. 2007-255249.

* cited by examiner

FIG. 2

```
NEW CREATION: BULLETIN BOARD CREATION CONDITION

CONDITION VALUE   [SUM(${REQUEST AMOUNT}) > ${ESTIMATED AMOUNT}]

DETAIL CONDITION  [DEFINITION NAME] IS [PURCHASE REQUEST]
                  [CASE NAME]
                  [TASK NAME]

CONFERENCE        THE EXPECTED AMOUNT OF PURCHASE REQUEST EXCEEDS THE
MESSAGE           ESTIMATED AMOUNT. PLEASE CONFER SO THAT A PURCHASE
                  AMOUNT RESULT DOES NOT EXCEED THE ESTIMATED AMOUNT BY
                  ADJUSTING REQUEST APPROVAL AND REJECTION.

CONFERENCE        ● [5] [DAYS ▼] FROM THE CREATION DATE
TIME LIMIT        ○ [MARCH] [31], [2007]
                  ○ [TASK MATCHING UP TO CONDITION ▼] AND
                    [HAVING MOST RECENT ▼] DUE DATE

[DECISION]    [CANCEL]
```

FIG. 3

```
NEW CREATION: TASK EXTRACTING CONDITION

DETAIL CONDITION  [DEFINITION NAME] IS [PURCHASE REQUEST]
                  [CASE NAME]
                  [TASK NAME]

[AND ▼]

[DEFINITION NAME] IS [PURCHASE REQUEST APPROVAL]
                  [CASE NAME]
                  [TASK NAME]

[DECISION]    [CANCEL]
```

FIG. 4

| CONDITION ID | BULLETIN BOARD CREATION CONDITION | TASK EXTRACTING CONDITION | CONFERENCE ATTRIBUTE INFORMATION |
|---|---|---|---|
| 1 | CREATION CONDITION 1 | EXTRACTING CONDITION 1 | ATTRIBUTE INFORMATION 1 |
| 2 | CREATION CONDITION 2 | EXTRACTING CONDITION 2 | ATTRIBUTE INFORMATION 2 |
| ⋮ | ⋮ | ⋮ | ⋮ |

FIG. 5

| BULLETIN BOARD ID | TASK ID |
|---|---|
| 0 0 1 | 1 1 1 1, 2 2 2 2, 3 3 3 3, 4 4 4 4 |
| 0 0 2 | 5 5 5 5, 6 6 6 6, 7 7 7 7 |
| ⋮ | ⋮ |

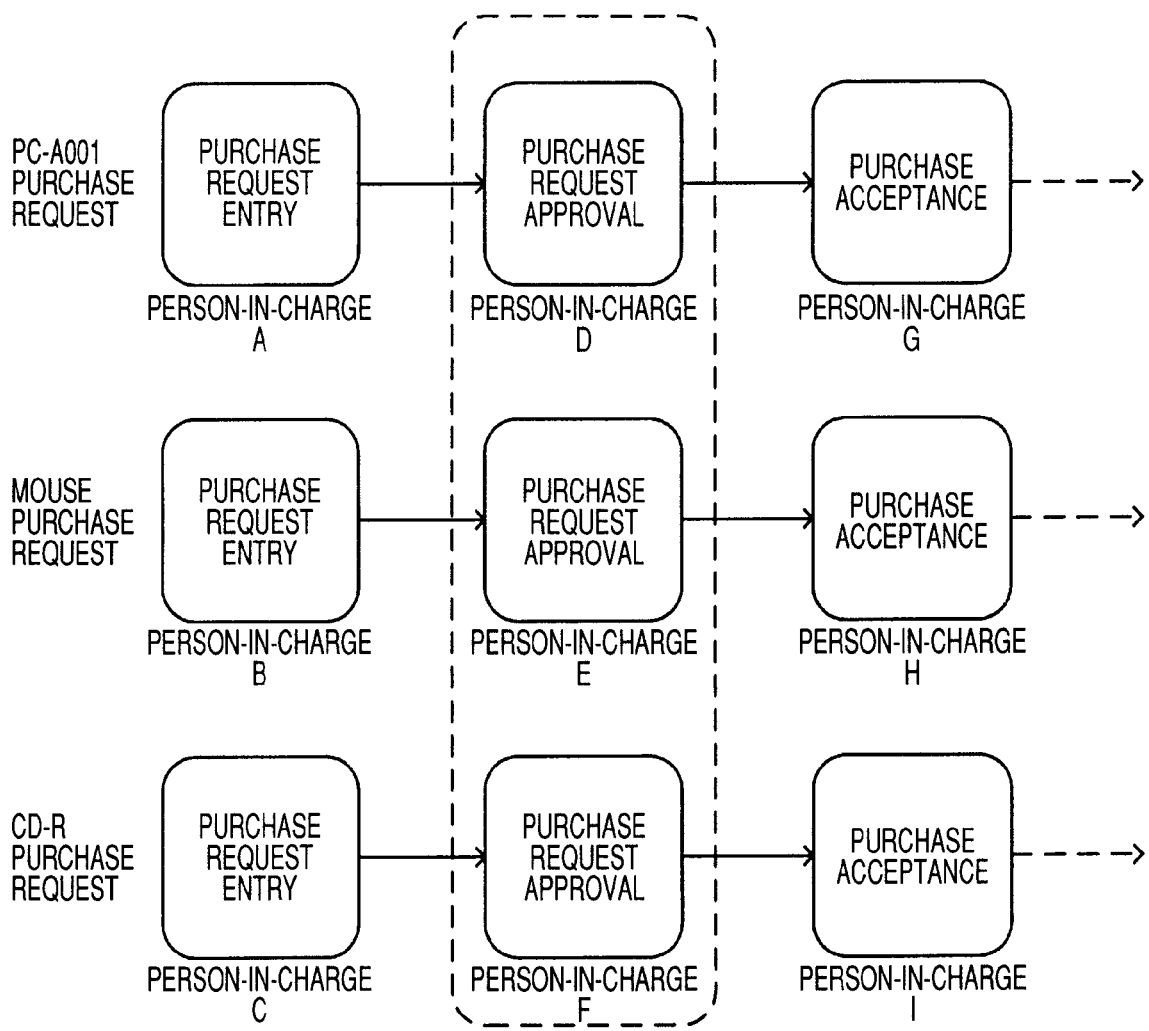

FIG. 8

DELEGATION OF FORM EDIT AUTHORITY

DELEGATION SUBJECT: E / F

DELEGATION FORM NAME: PC-A001 PURCHASE REQUEST

[DECISION] [CANCEL]

FIG. 9

TASK: PURCHASE REQUEST APPROVAL

| | |
|---|---|
| CASE NAME | PC-A001 PURCHASE REQUEST |
| PURCHASE ARTICLE PRODUCT NUMBER | PC-A001 |
| PURCHASE ARTICLE NAME | PERSONAL COMPUTER |
| ARTICLE PRICE | 88,000 |
| PURCHASE ESTIMATED REMAINDER IN CURRENT TERM | 100,000 |
| APPROVAL PROPRIETY | ○ APPROVAL  ○ REJECTION |

[DECISION] [CANCEL]

FIG. 10

TASK: PURCHASE REQUEST APPROVAL

BEDIT AUTHORITY OF THE FORM IS DELEGATED FROM MR. D TO MR. F

CONFERENCE BULLETIN BOARD: BULLETIN BOARD OF PERSON-IN-CHARGE OF 'PURCHASE REQUEST APPROVAL'

| | |
|---|---|
| CASE NAME | PC-A001 PURCHASE REQUEST |
| PURCHASE ARTICLE PRODUCT NUMBER | PC-A001 |
| PURCHASE ARTICLE NAME | PERSONAL COMPUTER |
| ARTICLE PRICE | 88,000 |
| PURCHASE ESTIMATED REMAINDER IN CURRENT TERM | 100,000 |
| APPROVAL PROPRIETY | ◯ APPROVAL   ◯ REJECTION |

[ DECISION ]   [ CANCEL ]

WORKFLOW SYSTEM AND COMPUTER READABLE MEDIUM

CROSS-REFERENCE TO RELATED APPLICATIONS

This application is based on and claims priority under 35 U.S.C. 119 from Japanese Patent Application No. 2007-255249 filed Sep. 28, 2007.

BACKGROUND

1. Technical Field

The present invention relates to a workflow system and a computer readable medium.

2. Related Art

Generally, there has been a workflow system for managing various business processes such as a circulation, a request for decision, and a consensual decision. As exemplarily shown in FIG. 12, a workflow is made by connecting tasks to each other such as 'purchase request entry', 'purchase request approval', and 'purchase acceptance' in a process of purchasing articles in accordance with business flow and is established in accordance with business contents. In addition, in the tasks constituting the workflow, at least one person in charge is assigned, and when a task is accomplished, an instruction for starting the next task is notified to a person in charge of the next task in the current workflow. As described above, the workflow system is configured to be able to effectively manage business progress in accordance with the established workflow.

SUMMARY

According to an aspect of the present invention, a workflow system includes: a workflow storage that stores workflows built by connecting a plurality of tasks assigned to persons in charge, respectively; a task extracting unit that extracts at least one task from each of two or more of the workflows stored in the workflow storage; a site creation unit that creates a conference site of which an access authority is given to the persons in charge of the tasks extracted by the task extracting unit and in which electronic information is shared; and an access controller that controls access to the conference site created by the site creation unit in accordance with the authority.

BRIEF DESCRIPTION OF THE DRAWINGS

Exemplary embodiment of the present invention will be described in detail based on the following figures, wherein:

FIG. 2 is a diagram illustrating an exemplary screen for designating a bulletin board creation condition and conference attribute information;

FIG. 3 is a diagram illustrating an exemplary screen for designating a task extracting condition;

FIG. 4 is a diagram illustrating exemplary information registered in a condition storage section;

FIG. 5 is a diagram illustrating exemplary information managed in a bulletin board creation instruction section;

FIG. 6 is a diagram illustrating three exemplary workflow of 'purchase request';

FIG. 7 is a diagram illustrating an exemplary bulletin board provided by a bulletin board system;

FIG. 8 is a diagram illustrating an exemplary screen for delegating an edit authority of a form of 'purchase request approval';

FIG. 9 is a diagram illustrating an exemplary form of 'purchase request approval' before the edit authority is delegated;

FIG. 10 is a diagram illustrating an exemplary form of 'purchase request approval' after the edit authority is delegated;

DETAILED DESCRIPTION

Hereinafter, an embodiment of the invention will be described with reference to drawings.

Figure 1:
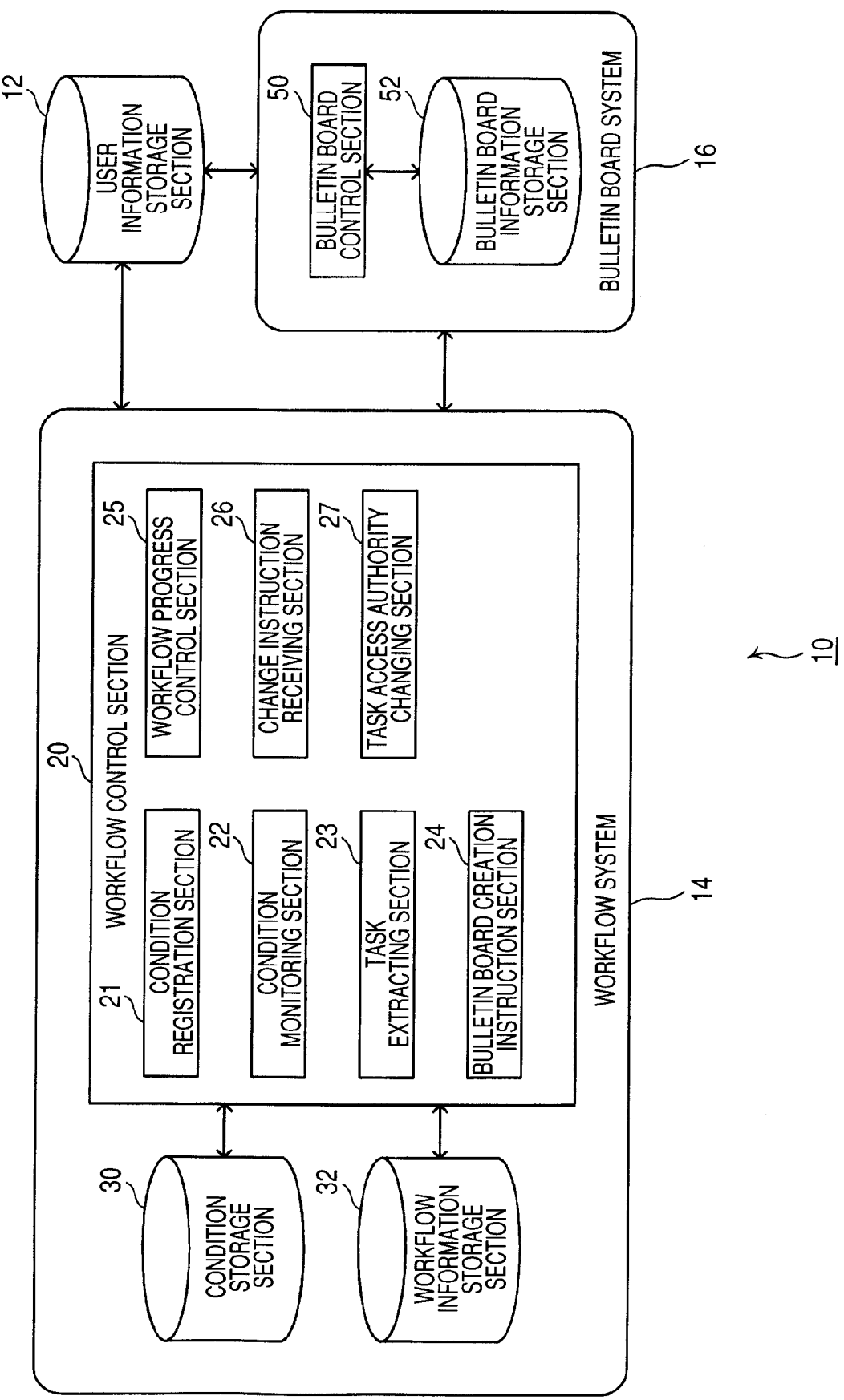
FIG. 1 is a block diagram illustrating an exemplary configuration of the information managing system according to the embodiment of the invention.

FIG. 1 is a block diagram illustrating an exemplary configuration of the information managing system 10 according to the embodiment of the invention. As shown in the same drawing, the information managing system 10 includes a user information storage section 12, a workflow system 14, and a bulletin board system 16. A user terminal (not shown in the drawings) for using the user information storage section 12, the workflow system 14, the bulletin board system 16, and the information managing system 10 is directly or indirectly connected through a network (not shown in the drawing) such as a LAN (Local Area Network), a WAN (Wide Area Network), or an internet. Thus, the user terminal enables mutual data communication.

The user information storage section 12 includes at least one of a storage device such as a hard disk device and a memory element such as a RAM or a ROM, and the user information storage section 12 stores various information about a user of the information managing system 10. Specifically, in association with a user ID for identifying a user, the user information storage section 12 stores a user name, a login password used in a user certification at the time when the user logs in to the information managing system 10, and a group including the user.

Figure 12:
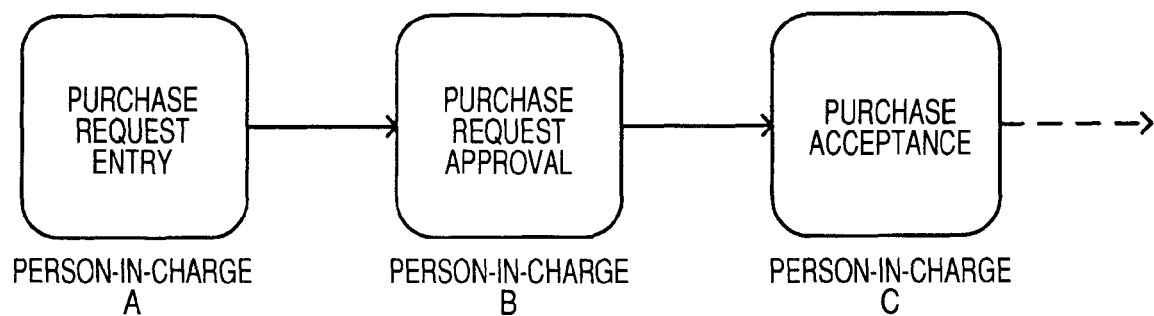
FIG. 12 is a diagram illustrating an exemplary workflow managed in the workflow system.

The workflow system 14 is a server computer that is known to all and has a data communication section such as a LAN card and a storage section such as a hard disk, and manages workflows (see FIG. 12) built by connecting a plurality of tasks assigned to at least one person in charge according to business flow. The workflow system 14 can manages not only a workflow in which a plurality of tasks is connected in one direction, but also a complex workflow including condition divergence at which a task of a transition destination is changed depending on a condition and a re-execution process of re-executing an executed task.

The bulletin board system 16 is a server computer that is known to all and has a data communication section such as a LAN card and a storage section such as a hard disk, and in view of function, includes a bulletin board control section 50 and a bulletin board information storage section 52.

The bulletin board control section 50 is formed as a program for controlling CPU and an operation of CPU, and controls the respective sections of the bulletin board system 16. For example, according to request of a user or an instruction of the workflow system 14, an electronic bulletin board (hereinafter, it is referred to as simply 'bulletin board') is created, and the created bulletin board is provided to a user terminal. In the bulletin board, a plurality of users can post and read information such as a message and an electronic file. Access to the bulletin board is controlled by a bulletin board access authority (a conference authority, a read authority, and a null authority) that belongs to the respective users.

The bulletin board information storage section 52 stores various information on a bulletin board created by the bulletin board control section 50. For example, in association with a bulletin board ID for identifying a bulletin board, the bulletin board information storage section 52 stores a user ID belonging to a user who participates in the bulletin board, a title of the bulletin board, and a document and an electronic file posted on the bulletin board.

In the information managing system 10 having the configuration, when an event satisfying a predetermined condition occurs, at least one task related to the condition is extracted from each of two or more workflows managed by the workflow system 14, and the bulletin board for conferring between persons in charge of the extracted tasks is created by the bulletin board system 16. Specifically, the persons in charge of the tasks extracted from the two or more workflows can confer with each other by using the information managing system 10.

A user terminal not shown in the drawings is a computer terminal known to all, for example a personal computer, having a display section such as a display, an input section such as a keyboard and a mouse, and a data communication section such as a LAN card. In the user terminal, there is stored a program (a web browser, an exclusive application, and the like) for building a workflow in the workflow system 14, executing tasks included in the workflow, reading the bulletin board provided by the bulletin board system 16, and posting information on the bulletin board.

Hereinafter, a function having the workflow system 14 will be described in further detail.

As shown in FIG. 1, the workflow system, in view of function, includes a workflow control section 20, a condition storage section 30, and a workflow information storage section 32.

The workflow information storage section 32 stores various information related to a workflow managed by the workflow system 14. Specifically, the workflow information storage section 32 stores a workflow ID for identifying a workflow, an case name which is a name of the workflow, information (a task ID for identifying a task, a task name, a task content, person-in-charge information such as a person-in-charge ID, a task access authority representing whether access to the task is allowable or not, and time limit of the task) related to tasks constituting the workflow, information representing a task connection order, progress control information for controlling progress of the workflow, the other attribute information, and the like.

As for the workflows managed by the workflow system 14, there are a workflow built when a user connects random tasks to each other in random order, and a workflow built based on 'workflow definition' in which tasks constituting the business and a connection order of the tasks are previously defined for every representative business process. For example, in workflow definition of 'purchase request', there is previously defined a form (a template) of a workflow in which tasks such as 'purchase request entry', 'purchase request approval', and 'purchase acceptance' are connected in order. The workflow definition (including a definition name) is also stored in the workflow information storage section 32.

The workflow control section 20 is formed of a program for controlling a CPU and an operation of the CPU, and controls the respective sections of the workflow system 14. Particularly, the workflow control section 20 includes a condition registration section 21, a condition monitoring section 22, a task extracting section 23, a bulletin board creation instruction section 24, a workflow progress control section 25, a change instruction receiving section 26, a task access authority changing section 27. The workflow control section 20 executes various processes for managing the workflow. The CPU executes the program stored in a storage section such as a hard disk device, and thus these functions are embodied. The program may be provided through a communication network such as an internet, and may be also provided by being stored in various computer readable recording mediums such as a flexible disk, a CD-ROM, and a DVD-ROM.

The condition registration section 21 registers 'bulletin board creation condition', which is a condition for creating bulletin board in the bulletin board system 16, on the condition storage section 30 to be described later on the basis of condition registration instruction received from the user terminal. In addition, in association with the bulletin board creation condition, the condition registration section 21 registers 'task extracting condition', which is a condition for extracting a task, and 'conference attribute information', which represents an attribute related to a conference in the created bulletin board, on the condition storage section 30. Here, the condition registration instruction received form the user terminal will be described in detail.

FIG. 2 is a diagram illustrating an exemplary screen for designating a bulletin board creation condition and conference attribute information displayed on a display section of the user terminal. In the screen, there are provided 'condition value' and 'detail condition' as spaces for designating the bulletin board creation condition. To the space of 'condition value', a user can designate a condition expression and the like including a predetermined attribute value (a variable) and the like. To the space of 'detail condition', the user also can designate a definition name (which is a name of workflow definition used to build a workflow), a case name (which is a name of the workflow), a task name (which is a name of a task constituting the workflow), and the like. In this case, a condition where "sum of a workflow attribute 'request amount' based on a workflow definition 'purchase request' exceeds attribute 'estimated amount'" is designated as the bulletin board creation condition. The space of 'condition value' and the space of 'detail condition' are not limited to a text box shown in FIG. 2, and may be formed of radio buttons and a full down menu capable of selecting items from a plurality of choices.

In the screen, there are provided 'conference message' and 'conference time limit' for designating conference attribute information. To the space of 'conference message', a user can designate a message displayed on the bulletin board created when the bulletin board creation condition is satisfied (or included in the notification to the effect that a bulletin board is created). To the space of 'conference time limit', the user can also designate time limit in which the conference in the created bulletin board should be concluded, for example a period (during one week) or an absolute date (until Mar. 31, 2007), a combination of information (time limit of a workflow including tasks, time limit of the tasks, the total number of the persons in charge of tasks, degree of persons in charge' skill, and the like) related to the tasks satisfying a task extracting condition to be described later, and the like.

FIG. 3 is a diagram illustrating an exemplary screen for designating a task extracting condition displayed on the display section of the user terminal. Two spaces of 'detail conditions' combined by 'and' or 'or' is provided as spaces for designating a task extracting condition. A user can designate a definition name, a case name, a task name, and the like to these spaces. These spaces is not limited to the text box shown in FIG. 3, and may be formed of, for example, radio buttons, a full down menu, and the like.

The task extracting condition is designated in association with the bulletin board creation condition. Hence, the screen is configured to be displayed in association with the screen shown in FIG. 2. For example, the screen shown in FIG. 3 may be displayed after 'decision' button is pressed on the screen shown in FIG. 2, and may be displayed with the screen shown in FIG. 2.

The bulletin board creation condition, the conference attribute information, and the task extracting condition designated in the manner as described above are transmitted as a condition registration instruction from the user terminal to the workflow system 14. In this case, the condition registration section 21 registers on the condition storage section 30 these information included in the condition registration instruction. FIG. 4 is a diagram illustrating exemplary information registered in a condition storage section 30 by a condition registration section 21. As described in the drawing, the condition storage section 30 stores the bulletin board creation condition, the task extracting condition, and the conference attribute information, in association with condition ID for identifying the bulletin board creation condition.

The condition monitoring section 22 monitors whether the bulletin board creation condition stored in the condition storage section 30 is established or not. In addition, when an event causing the bulletin board creation condition to be established occurs, the condition ID representing the current bulletin board creation condition is notified to the task extracting section 23. The condition monitoring section 22 may check whether the bulletin board creation condition is established or not in a predetermined cycle, and may check whether the bulletin board creation condition is established or not whenever progress situation of the workflow stored in the workflow information storage section 32 is changed.

The task extracting section 23 extracts at lest one task from each of the two or more workflows stored in the workflow information storage section 32, on the basis of a monitoring result from the condition monitoring section 22. Specifically, from the condition storage section 30, the task extracting section 23 acquires the conference attribute information and the task extracting condition stored in association with the condition ID notified by the condition monitoring section 22. In addition, from the workflow information storage section 32, the task extracting section 23 extracts a task satisfying the acquired task extracting condition, and acquires information of a person in charge of the task. In this case, when the number of workflows including the extracted tasks is two or more, the task extracting section 23 outputs to the bulletin board creation instruction section 24 a conference attribute information and a person-in-charge ID (a user ID of a person in charge) included in the acquired person-in-charge information. Conversely, when the number of workflows including the extracted tasks is not more than one, the task extracting section 23 does not give an output to the bulletin board creation instruction section 24.

The bulletin board creation instruction section 24 creates on the bulletin board system 16 a bulletin board for conferring between persons in charge of tasks extracted by the task extracting section 23. Specifically, to the bulletin board system 16, the bulletin board creation instruction section 24 transmits a bulletin board creation instruction including the conference attribute information and the person-in-charge ID inputted from the task extracting section 23.

When the bulletin board creation instruction transmitted from the workflow system 14 (the bulletin board creation instruction section 24) is received, the bulletin board system 16 creates the bulletin board based on the bulletin board creation instruction. Specifically, the bulletin board control section 50 creates a bulletin board based on the conference attribute information (a conference message, a conference time limit, or the like) included in the bulletin board creation instruction. In addition, conference authority for conferring on the bulletin board is given to the persons in charge so that the persons in charge identified by the person-in-charge ID included in the bulletin board creation instruction become participants. In addition, the bulletin board control section 50 stores the various information (described above) about the created bulletin board in the bulletin board information storage section 52, and replies the bulletin board ID for identifying the bulletin board to the workflow system 14.

In the bulletin board created in the manner as described above, for example, 'conference message' included in the conference attribute information is posted as initial information. In addition, the bulletin board control section 50 may end the conference in the created bulletin board according to elapse of 'conference time limit' included in the conference attribute information.

When the workflow system 14 receives the bulletin board ID replied from the bulletin board system 16, the bulletin board creation instruction section 24, as shown in FIG. 5, stores the task IDs of the tasks extracted by the task extracting section 23 in association with the received bulletin board ID. The bulletin board creation instruction section 24 may store these information in the storage section.

In the same manner as described above, when the bulletin board is created in the bulletin board system 16, an object of creating the bulletin board is notified to the person in charge who is a participant of the bulletin board, by a predetermined notification method (a notice of a top page of the information managing system 10, an electronic mail, and the like). The person in charge receiving the notification participates in the bulletin board created by using the user terminal and can confer with the other participant through the bulletin board.

The workflow progress control section 25 restricts progress of the two or more workflows including the tasks associating with the current bulletin board, until the bulletin board is created by the bulletin board system 16 and the conference is ended in the bulletin board. Specifically, when the bulletin board ID is replied from the bulletin board system 16, the workflow progress control section 25 acquires the task ID managed in association with the bulletin board ID from the bulletin board creation instruction section 24. In addition, the workflow progress control section 25 changes the progress control information stored in the workflow information storage section 32 so as to restrict the progress of the workflow including the tasks identified by the acquired task ID.

When the workflow progress is restricted in the manner as described above, any person in charge belonging to the current workflow can not execute the task until the progress restriction is released. Hence, until the conference in the bulletin board is ended, it is possible to suppress error progression of the workflow subjected to the conference.

When the conference in the bulletin board is ended (for example, when a predetermined message representing conference end is posted on the bulletin board, when 'conference end' button provided on a predetermined position in the bulletin board is pressed, or when 'conference time limit' set in the bulletin board is elapsed), the bulletin board system 16 sends to the workflow system 14 a notification to the effect that the conference in the current bulletin board is ended. In addition, the workflow progress control section 25 changes the progress control information stored in the workflow information storage section 32 so as to release the progress restriction of the workflow subjected to the conference.

From persons in charge of tasks extracted at least by the task extracting section 23, the change instruction receiving section 26 receives a change instruction of an authority (a task access authority) of access to the tasks (see FIG. 8 to be described later). The change instruction of the task access authority includes the task ID of the task changing the task access authority, the person-in-charge ID of the person in charge capable of giving or revoking the task access authority, and a type (an access authority or an execution authority) of the task access authority given or revoked. To a specific person in charge of the persons in charge participating in the conference, it is allowed to give an authority for changing an access authority to a task other than the task of the specific person in charge.

The task access authority changing section 27 changes the task access authority of the task related to the change instruction stored in the workflow information storage section 32, in accordance with the change instruction received by the change instruction receiving section 26.

Hereinafter, a process related to change of the task access authority will be described in detail with reference to a case where three workflows of 'purchase request' ('PC-A001 purchase request', 'mouse purchase request', and 'CD-R purchase request') shown in FIG. 6 is managed by the workflow system 14. The condition storage section 30 stores the bulletin board creation condition (see FIGS. 2 and 4) where "sum of a workflow attribute 'request amount' based on a workflow definition 'purchase request' exceeds attribute 'estimated amount' ", the task extracting condition (see FIGS. 3 and 4) where "workflow definition is 'purchase request' and a task name is 'purchase request approval' ", and the conference attribute information (see FIGS. 2 and 4) including 'conference message' or 'conference time limit' in association with each other.

When the event causing the bulletin board creation condition to be established occurs, the task (three tasks of 'purchase request approval' surrounded by a dashed line in FIG. 6) satisfying the task extracting condition associating with the bulletin board creation condition is extracted, the bulletin board in which the persons in charge D, E, and F of the extracted task is participated is created in the bulletin board system 16. In this case, notification (for example, a message including 'conference message' or 'conference time limit' included in the conference attribute information associating with the bulletin board creation condition) to the effect that the bulletin board is created in order to confer on the purchase request approval tasks is sent to the persons in charge D, E, and F. The person in charge D, E, and F who received the notification participate in a bulletin board provided by the bulletin board system 16 and confer with the other participant through the bulletin board by using the user terminals, respectively.

FIG. 7 is a diagram illustrating an example of bulletin board displayed on a display section of a user terminal (which is the user terminal of the person in charge D in the example). In the screen, there is displayed a title of the bulletin board, a message posted by a participant, a list of participants, buttons (a button to the effect that 'open a form to all' for displaying an instruction screen capable of changing an access authority of a purchase request approval form with respect to a PC-A001, and a button to the effect that 'an edit authority is delegated' for displaying an instruction screen capable of changing the edit authority) related to change of the access authority to the purchase request approval tasks and the like. Here, when the person in charge D press the button to the effect that 'the edit authority is delegated', a screen shown in FIG. 8 is displayed on the display section of the user terminal.

FIG. 8 is a diagram illustrating an example of a screen for delegating an edit authority of a form of 'purchase request approval'. On the screen, a delegation subject (who is the person in charge E or F in the example) of the edit authority of the form of 'purchase request approval' and a delegation form name (which is only 'PC-A001 purchase request' in the example) is displayed. Here, the person in charge D presses the button of 'decision' after 'person in charge F' is selected as the delegation subject and 'PC-A001 purchase request' is selected as the delegation from name. In this case, the task ID of the task of 'purchase request approval' in the workflow of 'PC-A001 purchase request' assigned to the person in charge D, the ID of the person in charge F which is the delegation subject, and a type of the given task access authority (an execution authority) are transmitted as a change instruction to the change instruction receiving section 26. In addition, according to the change instruction received by the change instruction receiving section 26, the task access authority changing section 27 changes the access authority to the task of 'purchase request approval' in the workflow of 'PC-A001 purchase request' stored in the workflow information storage section 32 so as to delegate the execution authority (which is the edit authority of the form of 'purchase request approval' in the example) of the task of 'purchase request approval' from the person in charge D to the person in charge F. With such a configuration, the form of 'purchase request approval' with respect to the PC-A001 displayed on the user terminal of the person in charge D is changed from the state shown in FIG. 9 to the state shown in FIG. 10.

FIG. 9 is a diagram illustrating an exemplary form of 'purchase request approval' before the edit authority is delegated from the person in charge D to the person in charge F. In the form, there are provided a space for displaying task name, case name, purchase article product number, purchase article name, article price, purchase estimated remainder in the current term, and the like, and a space for designating approval or not. In addition, the person in charge D selects the button of 'approval' or the button of 'rejection' in the space for designating approval or rejection, and thus can approve or reject the purchase request of the article name 'PC-A001'. However, the bulletin board creation condition is established, and the bulletin board is created by the bulletin board system 16 in order to confer on the task of 'purchase request approval'. In this case, until the conference between the persons in charge D, E, and F in the bulletin board is ended, progress of three workflows of 'purchase request' ('PC-A001 purchase request', 'mouse purchase request', and 'CD-R purchase request') is restricted by the workflow progress control section 25. Thus, the person in charge D can not approve the purchase request in the form.

FIG. 10 is a diagram illustrating an exemplary form of 'purchase request approval' after the edit authority is delegated from the person in charge D to the person in charge F. When the edit authority of the form of 'purchase request approval' with respect to the PC-A001 is delegated from the person in charge D to the person in charge F, on the upper part of the form, there are displayed the effect that the authority is delegated and a link to the bulletin board used in the conference until the delegation is complete, as shown in the drawing.

Next, exemplary operation of the workflow system 14 will be described.

Figure 11:
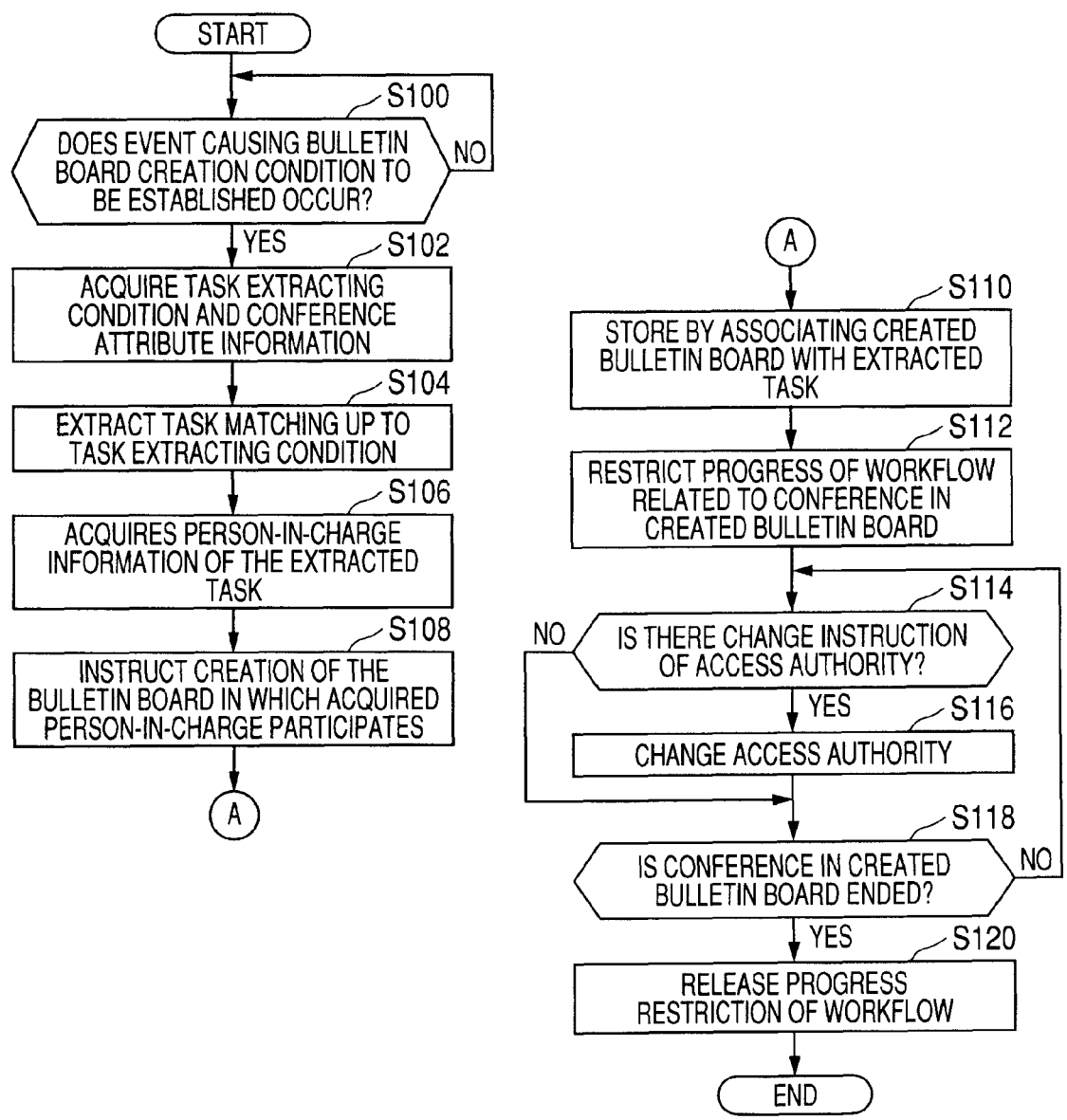
FIG. 11 is a flowchart illustrating an exemplary process executed in the workflow system.

FIG. 11 is a flowchart illustrating an exemplary process executed in the workflow system 14. As shown in the drawing, the condition monitoring section 22 monitors whether the bulletin board creation condition stored in the condition storage section 30 is established or not (S100, S100: N). Here, when an event causing the bulletin board creation condition to be established occurs (S100: Y), the task extracting section 23 is acquires from the condition storage section 30 the conference attribute information and the task extracting condition stored in association with the bulletin board creation condition established in the step S100 (S102). In addition, the task satisfying the acquired task extracting condition is extracted from the workflow information storage section 32 (S104). In addition, the person-in-charge information of the extracted task is acquired from the workflow information storage section 32 (S106).

Next, the bulletin board creation instruction section 24 transmits to the bulletin board system 16 the bulletin board creation instruction including the conference attribute information acquired from the step S102 and the person-in-charge ID acquired from the step S106 so as to create the bulletin board in which the person in charge identified by the person-in-charge ID acquired from the step S106 participates (S108).

When the bulletin board is created by the bulletin board system 16, the bulletin board creation instruction section 24 stores the task IDs of the tasks extracted from the step S104, in association with the bulletin board ID replied from the bulletin board system 16 (S110). Next, the workflow progress control section 25 restricts the progress of the two or more workflows including the tasks associating with the created bulletin board, until the conference in the created bulletin board is ended (S112, S118: N). Meanwhile, when the change instruction receiving section 26 waits the change instruction of the access authority to the tasks extracted from the step S104 (S114, S114: N) and there is a change instruction of the access authority to any one of the tasks (S114: Y), the task access authority changing section 27 changes the access authority to the task related to the instruction in accordance with the change instruction (S116). In addition, when the conference in the created bulletin board is ended (S118: Y), the workflow progress control section 25 releases the progress restriction of the workflows in the step S112 (S120).

The workflow system 14 may store in log a change history of the task access authority or the conference content in the bulletin board in association with the tasks extracted from the step S104.

As described above, in the information managing system 10 according to the embodiment, when an event causing the previously registered bulletin board creation condition to be established occurs, at least one task related to the condition is extracted from each of the two or more workflows managed by the workflow system 14. In addition, the bulletin board for conferring between the persons in charge of the extracted tasks is created in the bulletin board system 16. That is, it is possible to create a site for conferring between the persons in charge of the tasks extracted from the two or more workflows.

For example, in the information managing system 10, the following elements are registered, respectively. "When sum of 'request amount', which is an attribute of the workflow, built on the basis of 'purchase request', which is the workflow definition, exceeds 'estimated amount' which is an attribute thereof" is registered as the bulletin board creation condition. "Purchase expected amount exceeds estimated amount" is registered as the conference message. "Recent due date of due dates of the workflow built on the basis of 'purchase request' which is a workflow definition" is registered as the conference time limit. "All tasks being executed of the tasks included in the workflow built on the basis of 'purchase request' which is a workflow definition" is registered as the task extracting condition. With such a configuration, the bulletin board for determining which purchase request is accepted is automatically created when the bulletin board creation condition is established. In addition, the conference time limit in the bulletin board is set so as to end the conference before time limit of any one of the workflows arrives. When the conference time limit is determined on the basis of the number of the persons in charge of the tasks satisfying the task extracting condition, the conference time limit is appropriately set in accordance with the number of persons participating in the conference.

In addition, it is possible to automatically create the bulletin board for conferring between the persons in charge of the workflow, which has high abnormal end rate (the workflow considered that the workflow definition itself has a problem), on the correspondence thereof, when the following elements are registered, respectively. "When the abnormal end rate of the workflow built on the basis of 'purchase request' which is a workflow definition is 50% or more" is registered as the bulletin board creation condition. "The case where the workflow of 'purchase request' is abnormally ended is increasing" is registered as the conference message. "All tasks included in the workflow built on the basis of 'purchase request' which is a workflow definition" is registered as the task extracting condition.

In addition, for example, it is possible to automatically create on Apr. 1, 2007 the bulletin board for adjusting in one month a task related to a project to be ended on Mar. 31, 2007, when the following elements are set, respectively. "When Apr. 1, 2007 arrives" is set as the bulletin board creation condition. "Due date of 'a corporation case project' arrives" is set as the conference message. "One month" is set as the conference time limit. "All tasks being executed of the tasks included in the workflow of which an attribute 'project name' is 'a corporation case project' " is set as the task extracting condition.

The invention is not limited to the embodiment mentioned above, and may be modified to various forms of the embodiment. For example, in the description mentioned above, the invention is applied to the information managing system 10 including the workflow system 14 and the bulletin board system 16, but the invention is applicable to a single-bodied workflow system having a function of creating a conference site. In addition, the conference site is not limited to the bulletin board, but may be a site capable of exchanging information by using a chatting, an electronic mail, or the like.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A workflow system comprising:
   a workflow storage that stores a first workflow and a second workflow for managing business processes, wherein the first workflow is different from the second workflow, the first workflow comprising a first plurality of tasks associated with persons in charge of the first plurality of tasks, respectively, and the second workflow comprising a second plurality of tasks associated with persons in charge of the second plurality of tasks, respectively, wherein the persons in charge of the first plurality of tasks are different from the persons in charge of the second plurality of tasks;

a condition storage that stores a task extracting condition, the task extracting condition identifying a task and an attribute value of the task; and a central processing unit (CPU) that functions as:

a condition monitoring unit monitors execution of the first plurality of tasks of the first workflow and the second plurality of tasks of the second workflow, determines that one of a first attribute of a first task among the first plurality of tasks of the monitored first workflow and a second attribute of a second task among the second plurality of tasks of the monitored second workflow satisfies the attribute value of the task stored by the condition storage, and determines that the first task and the second task correspond to the task stored by the condition storage;

a task extracting unit that extracts the first task, the second task, a first person in charge associated with the first task, and a second person in charge associated with the second task from the workflow storage, based on a result of the condition monitoring unit;

a site creation unit that creates a conference site of which an access authority is given to the first person in charge and the second person in charge extracted by the task extracting unit; and an access controller that controls access to the conference site created by the site creation unit in accordance with the access authority.

2. A non-transitory computer readable medium storing a program causing a computer, which is connected to a workflow storage device, which stores a first workflow comprising a first plurality of connected tasks assigned to persons in charge, respectively, and a second workflow comprising a second plurality of connected tasks assigned to persons in charge, respectively, and a task extracting condition, the task extracting condition identifying a task and an attribute value of the task, wherein the first workflow is different from the second workflow and wherein the persons in charge of first plurality of tasks are different from the persons in charge of the second plurality of tasks, to execute a process comprising:

monitoring execution of the first plurality of tasks of the first workflow and the second plurality of tasks of the second workflow;

determining that one of a first attribute of a first task among the first plurality of tasks of the monitored first workflow and a second attribute of a second tasks among the second plurality of tasks of the monitored second workflow satisfies the attribute value of the tasks stored by the condition storage and determining that the first and the second task correspond to the task stored by the condition storage;

extracting the first task, the second task, a first person associated with the first task, and second person in charge associated with the second task from the workflow storage, based on a result of the determining;

creating a conference site of which an access authority is given to the first person in charge of the task in the first workflow and the second person in charge of the task in the second workflow; and controlling access to the created conference site in accordance with the access authority.

3. The non-transitory computer readable medium as claimed in claim 2, the process further comprising:

restricting the first workflow and the second workflow until a conference in the conference site is finished.

4. The non-transitory computer readable medium as claimed in claim 2, the process further comprising:

storing a site creation condition serving as a condition for creating the conference site in a condition storage; and monitoring whether the stored site creation condition is satisfied, wherein the task is extracted in response to the site creation condition being satisfied.

5. The non-transitory computer readable medium as claimed in claim 4, the process further comprising:

storing the task extracting condition in association with the site creation condition, wherein the creating comprises extracting the site creating condition in response to the at least one task to be extracted is a task which satisfies the task extracting condition stored in association with the satisfied site creation condition.

6. The non-transitory computer readable medium as claimed claim 4, the process further comprising:

storing conference attribute information representing an attribute related to the conference in association with the site creation condition, wherein the conference site is created on the basis of the conference attribute information which is stored in association with the satisfied site creation condition.

7. The non-transitory computer readable medium as claimed in claim 6, wherein the conference attribute information includes information representing a time limit for the conference, and the conference in the conference site is finished in accordance with elapse of the time limit for the conference.

8. The non-transitory computer readable medium as claimed in claim 7, wherein the time limit for the conference is determined on the basis of information related to the extracted tasks.

* * * * *